United States Patent
Tazawa et al.

(10) Patent No.: US 7,231,118 B2
(45) Date of Patent: Jun. 12, 2007

(54) MULTICHANNEL ARRAY WAVEGUIDE DIFFRACTION GRATING MULTIPLEXER/DEMULTIPLEXER AND METHOD OF CONNECTING ARRAY WAVEGUIDE AND OUTPUT WAVEGUIDE

(75) Inventors: Ryouichi Tazawa, Yokohama (JP); Yutaka Natsume, Yokohama (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 11/374,776

(22) Filed: Mar. 14, 2006

(65) Prior Publication Data

US 2006/0177180 A1   Aug. 10, 2006

Related U.S. Application Data

(63) Continuation of application No. PCT/JP2004/017625, filed on Nov. 26, 2004.

(30) Foreign Application Priority Data

Nov. 28, 2003 (JP) .............................. 2003-400839
Nov. 26, 2004 (JP) .............................. 2004-342787

(51) Int. Cl.
*G02B 6/34* (2006.01)
(52) U.S. Cl. .......................................... 385/37; 385/24
(58) Field of Classification Search ................. 385/37
See application file for complete search history.

(56) References Cited

U.S. PATENT DOCUMENTS 6,665,466 B2 * 12/2003 Katayama .................... 385/24
6,888,985 B2 *  5/2005 Hosoi ........................... 385/37

2002/0001433 A1 *  1/2002 Hosoi .......................... 385/37

FOREIGN PATENT DOCUMENTS

| EP | 1 033 593 A1 | 9/2000 |
|---|---|---|
| EP | 1 291 689 A1 | 3/2003 |
| JP | 11-271557 | 10/1999 |
| JP | 11-344626 | 12/1999 |
| JP | 2000-258647 | 9/2000 |
| JP | 2001-13336 | 1/2001 |
| JP | 2002-14243 | 1/2002 |
| JP | 2002-116330 | 4/2002 |
| JP | 2002-116331 | 4/2002 |
| JP | 2002-148458 | 5/2002 |
| JP | 2003-195068 | 7/2003 |
| JP | 2003-400839 | 11/2003 |
| JP | 2004-312728 | 10/2004 |

* cited by examiner

*Primary Examiner*—Frank G. Font
*Assistant Examiner*—Mary El-Shammaa
(74) *Attorney, Agent, or Firm*—Scully, Scott, Murphy & Presser, P.C.

(57) ABSTRACT

An array waveguide diffraction grating optical multiplexer/demultiplexer having an input waveguide, an input side slab waveguide, an output side slab waveguide, an output waveguide, an array waveguide provided between the input side slab waveguide and output side slab waveguide having a length different sequentially between the adjacent waveguides, wherein the output waveguide is arranged so that the angle formed between each output waveguide and the normal line of the Rowland circle of the output waveguide is sequentially increased from the central output waveguide to the output waveguide at both ends of the central output waveguide, and asymmetry of the passband of the output waveguide based on the form of field distribution at a light collecting point of the output side slab waveguide is decreased.

11 Claims, 6 Drawing Sheets

MULTICHANNEL ARRAY WAVEGUIDE DIFFRACTION GRATING MULTIPLEXER/DEMULTIPLEXER AND METHOD OF CONNECTING ARRAY WAVEGUIDE AND OUTPUT WAVEGUIDE

CROSS-REFERENCE TO RELATED APPLICATIONS

This is a Continuation Application of PCT Application No. PCT/JP2004/017625, filed Nov. 26, 2004, which was published under PCT Article 21(2) in Japanese.

This application is based upon and claims the benefit of priority from prior Japanese Patent Applications No. 2003-400839, filed Nov. 28, 2003; and No. 2004-342787, filed Nov. 26, 2004, the entire contents of both of which are incorporated herein by reference.

BACKGROUND OF THE INVENTION

1. Field of the Invention

The present invention relates to an optical multiplexer/demultiplexer used in optical communications, and more particular to a multichannel array waveguide diffraction grating optical multiplexer/demultiplexer and a method of connecting an array waveguide and output waveguide.

2. Description of the Related Art

In the field of optical communications, a method (wavelength dividing multiplexing method) has been put into practical use to increase the capacity of transmission by sending a large capacity signal by using a high-frequency carrier wave.

In this method, an optical multiplexer/demultiplexer which multiplexes and demultiplexes signals with different wavelengths takes an important role.

Particularly, an array waveguide diffraction grating optical multiplexer/demultiplexer using an array waveguide diffraction grating (AWG) is useful for multiplying the number of channels. Regardless of the number of channels, a desired number of channels can be created in the same process and same number of steps, and in principle, loss and deterioration in characteristics are small.

When connecting an array waveguide diffraction grating (AWG) and an optical fiber as an output waveguide, a minimum coupling loss is demanded.

For example, Jpn Pat. Appln. KOKAI Publication No. 11-271557 proposes an example of a coupler comprising first waveguide line array has an M-channel and second waveguide line has an N-channel waveguide array, which has a pair of end portions, one end portion connected to an arc-shaped planer waveguide line having a center at the middle of the other end portion, wherein the N-channel second waveguide line array is arranged radially from the center point of the arc placed near the center of the end portion of the first waveguide line array.

However, it is generally known that if multichannel (N-channel) waveguides (waveguide lines) are arranged on the circumference of a Rowland circle drawn on the surface of curved diffraction grating to contact at the middle point, the asymmetry is different in the transmission characteristics of the waveguide (waveguide line) placed near the center of the N-channel waveguides (waveguide lines) and the waveguides (waveguide lines) placed at the terminal ends (both ends).

If the asymmetry of transmission characteristics is different in a pass bandwidth, PDL is locally degraded (the worst value of PDL increases). Further, in an array waveguide with flat top transmission characteristics, ripple in the pass bandwidth increases.

In Patent Document 1, there is no suggestion about a method of solving the above problems.

BRIEF SUMMARY OF THE INVENTION

It is an object of the present invention to decrease connection loss caused by a mismatched mode between a second slab waveguide and an output waveguide in an array waveguide diffraction grating (AWG) multiplexer/demultiplexer, and to obtain composing/decomposing characteristics with a small loss.

This invention is provided a multichannel array waveguide diffraction grating multiplexer/demultiplexer comprising:

an array waveguide which has cores layered on a base board and clad to cover the cores, each of the array waveguide given a predetermined curvature;

an input side slab waveguide which is layered on a base board, and inputs an optical signal input through an input waveguide to the array waveguide; and an output side slab waveguide which outputs the optical signal output from the array waveguide to an output waveguide, wherein the output waveguide is given a predetermined form changed to meet the form of field distribution at a light collecting point of the output side slab waveguide, and connected to the output side slab waveguide.

Namely, in the above-mentioned multichannel array waveguide diffraction grating multiplexer/demultiplexer, the output waveguide is given a predetermined form, which is changed to meet the form of field distribution at a light collecting point in the output slab waveguide, and connected to the output slab waveguide. Thus, connection loss is decreased, and asymmetry of transmission characteristics is decreased.

Also, this invention is provided a multichannel array waveguide diffraction rating multiplexer/demultiplexer comprising:

an array waveguide provided at a predetermined position on a base board;

a slab waveguide provided on the output side of the array waveguide; and an output waveguide which is connected to the slab waveguide, has a connecting surface forming a Rowland circle, and includes a core having angle formed with the normal line of the Rowland circle is defined by $\alpha$, $2\alpha$, $3\alpha$, ..., $(N-1)\alpha$, $N\alpha$ from the center core to the cores at both ends according to the position of the center core, when an angle formed between the center line of the core placed on both sides of the core placed at the center and the normal line of the Rowland circle is assumed to be $\alpha$.

Namely, in the above multichannel array waveguide diffraction grating multiplexer/demultiplexer, assuming that an angle formed between a normal line of the Rowland circle and a center line of the cores placed on both sides of a center core is $\alpha$, spell an angle between a normal line of the Rowland circle and a center line of the core, the cores provided for a desired number of channels are connected to the output side slab waveguide at an angle defined by $\alpha$, $2\alpha$, $3\alpha$, ..., $(N-1)\alpha$, $N\alpha$, from the center core to the cores on both sides, according to the position from the center core. The field distribution at the light collecting point of the slab waveguide becomes identical to the field distribution of the output waveguide. Therefore, the connection loss is decreased, and the evenness of the outputs of each channel is increased when a multichannel light wave is divided.

This invention is also provided a method of connecting an output waveguide which is connected to a slab waveguide provided in the output side of an array waveguide provided at a predetermined position on a base place, to the slab waveguide, wherein a desired number of cores is connected to each output port of the slab waveguide at an angle defined by $\alpha$, $2\alpha$, $3\alpha$, $(N-1)\alpha$, $N\alpha$, from the center core to the cores at both ends, according to the position of the center core on the circumference of the Rowland circle, when an angle formed with the normal line of the Rowland circle is an angle formed between the center line of the core placed on both sides of the core placed at the center and the normal line of the Rowland circle, and assumed to be $\alpha$.

Namely, in the above connection method, a desired number of output waveguides is provided for multichannel and the cores changed to meet the field distribution at a light collecting point of the slab waveguide at an angle defined by $\alpha$, $2\alpha$, $3\alpha$, . . . , $(N-1)\alpha$, $N\alpha$, from the center core on the circumference of Rowland circle to the cores on both sides according to the position from the center core on the circumference of the Rowland circle. Thereby, connection loss is decreased, and evenness of the outputs of each channel is increased.

DETAILED DESCRIPTION OF THE INVENTION

Embodiments of the present invention will be explained in detail hereinafter with reference to the accompanying drawings.

Figure 1:
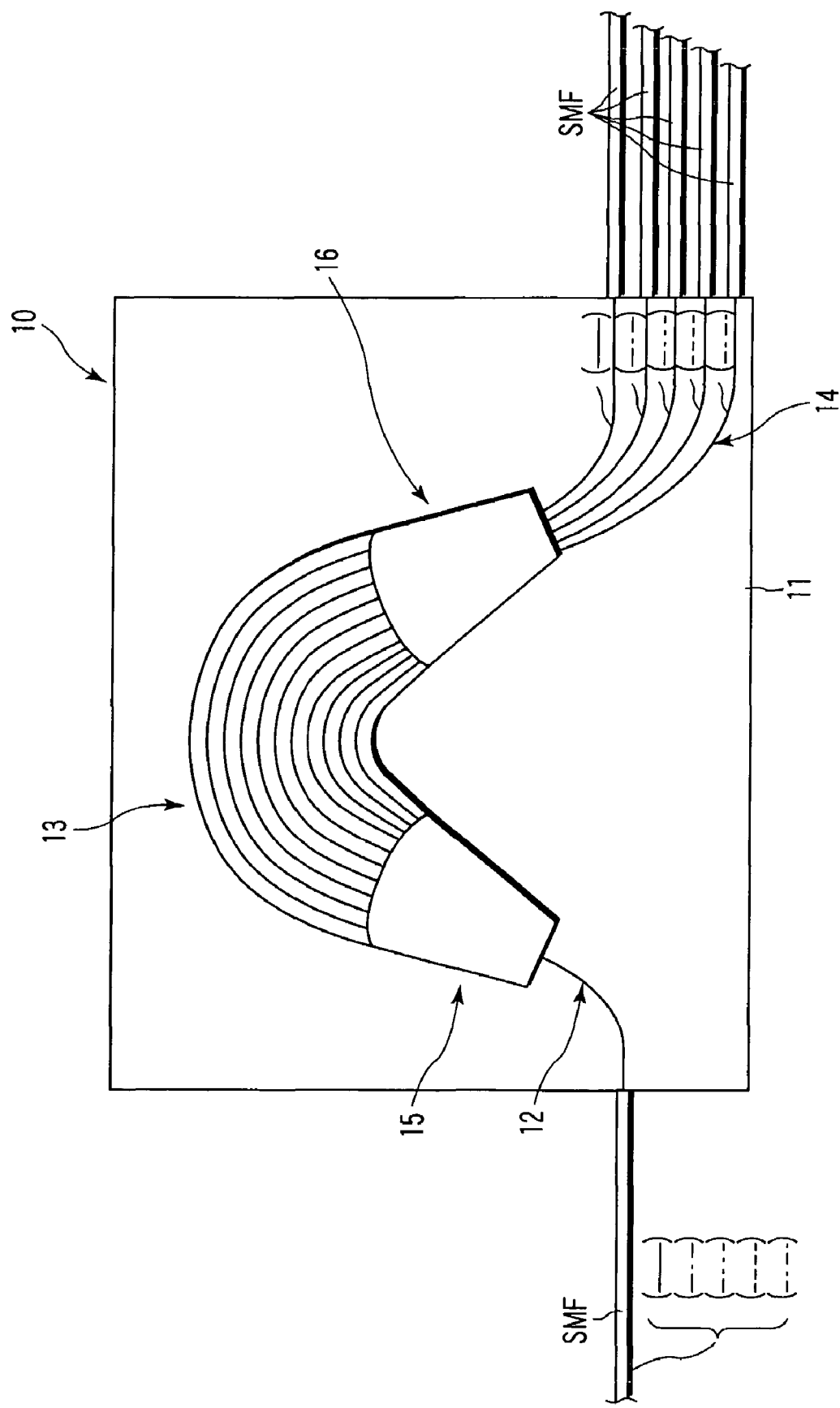
FIG. 1 is a schematic illustration for explaining an example of an array waveguide diffraction grating optical multiplexer/demultiplexer according to an embodiment of the present invention.

As shown in FIG. 1, an array waveguide optical multiplexer/demultiplexer 10 has an input waveguide 12, array waveguide 13 and output waveguide 14 provided at predetermined positions on a base board 11, and first and second slab waveguides 15 and 16 each optically connect the input waveguide 12 and the array waveguide 13 and the array waveguide 13 and the output waveguide 14.

The array waveguide 13 is formed with a predetermined curvature between the first and second slab waveguides 15 and 16.

Figure 2:
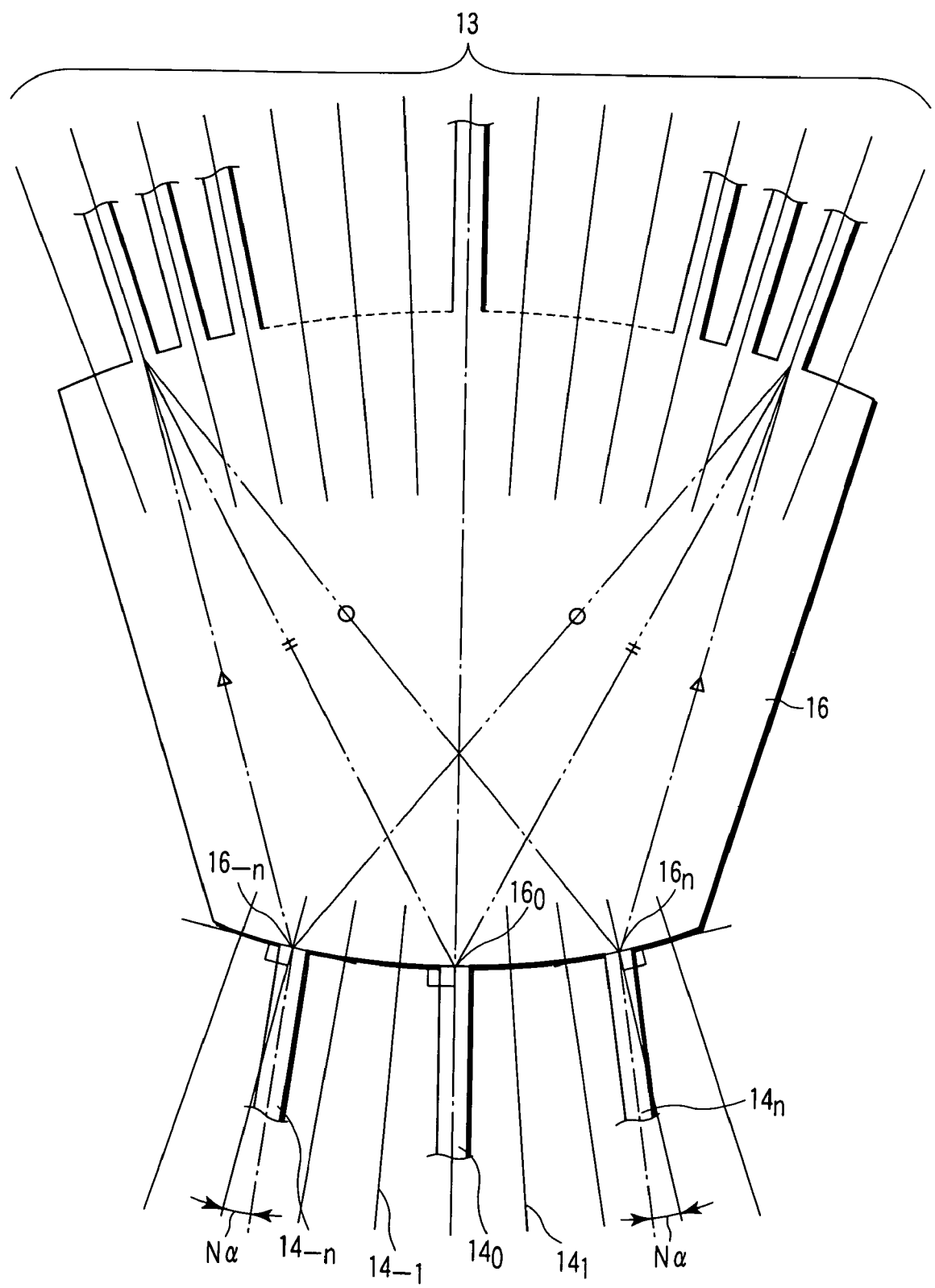
FIG. 2 is a schematic illustration for explaining an example of the configuration of the essential part of the array waveguide shown in FIG. 1.

As shown in FIG. 2, cores 14-$n$ to 14$n$ except a core 14$o$ of the output waveguide 14 are connected to output ports 16-$n$ and 16$n$ of the second slab waveguide 16 at a desired position on the circumference of the Rowland circle defining the output terminal of the second waveguide 16 in the state that the center axis is inclined by a predetermined angle against the normal line of the Rowland circle.

In particular, the center core 14$o$ is connected to the output port 16$o$ vertically to the normal line of the Rowland circle. Therefore, the centerlines of the output port 16$o$ and center core 14$o$ are aligned on the same straight line.

The cores 14-$n$ to 14$n$ (except 14$o$) connected to the output ports 16-$n$ to 16$n$ except the output port 16$o$ placed on the centerline are connected at a predetermined position of the second slab waveguide 16, so that as the center line is separated from the core 14$o$ placed at the center, the angle against the normal line of the Rowland circle is increased.

Namely, the cores 14-$n$ and 14$n$ connected to both end portions of the second slab waveguide 16 are connected to the second slab waveguide 16, so that the angle $\alpha \times n$ ($-n$) against the normal line of the centerline becomes maximum. The core 14-1 (shown simply) and core 141 (shown simply) placed on both sides of the core 14$o$ placed at the center are connected to the second slab waveguide 16, so that the angle $\alpha \times n$ ($-n$) against the normal line of the centerline becomes minimum. The angle $\alpha$ formed between the centerline of each core and the normal line of the Rowland circle is defined on the side of the center core 14$o$. Therefore, the angle $N\alpha$ formed between the centerline and the normal line of the Rowland circle is equal in magnitude and the polarity (direction) is reverse in the core 14-$n$ at one end and core 14$n$ at the other end.

More particularly, the angle $\alpha \times n$ ($-n$) formed between the centerline of the cores 14-$n$ to 14$n$ except 14$o$ placed at the center and the normal line of the Rowland circle is set to decrease the influence of the difference between the sum of the distances traveled by the two lights collected at the center of the output side from both ends of the input side of the slab waveguide 16 (the optical path length of the optical path marked with ◯) and the sum of the distances traveled by the two lights collected from one end portion of the input side of the slab waveguide 16 at both end portions of the output side (the optical path lengths of the optical paths marked with ∆ and Π), when a light is input from the second slab waveguide 16 to the array waveguide 13 shown in FIG. 2, that is, the difference in distance between the sum of the optical path length to transmit a light with a longest optical path length and the optical path length to transmit a light with a shortest optical path length. In this case, assuming that the angle formed between the center line of the core placed on both sides of the core 14$o$ placed at the center and the normal line of the Rowland circle is $\alpha$, the angle formed between the center line of the cores 14-$n$ to 15$n$ and the normal line of the Rowland circle is easily defined by $\alpha$, $2\alpha$, $3\alpha$, . . . , $(N-1)\alpha$, $N\alpha$ toward the cores at both ends from the center core, according to the position from the center core 14$o$. As described above, in a core placed at any desired position in one end side and the core placed at the same position on the other end side, the angle $\alpha$ formed between the center line and the normal line of the Rowland circle is equal in magnitude and the polarity (direction) is reverse.

By connecting the cores connected to the output ports at the output end of the (output) slab waveguide connected to the output side of the array waveguide by changing the angle formed with the normal line of the Rowland circle according to the distance from the center of the slab waveguide, as described above, the increase of the asymmetry of transmission characteristics in the pass bandwidth can be prevented. Namely, the local deterioration of PDL (increase of the worst PDL value) explained later with reference to FIG. 7 can be decreased. Ripple in the pass bandwidth to occur in the array waveguide having generally flat transmission characteristics as explained later with reference to FIG. 8 can be decreased.

In the present invention, the principle of preventing the increase of asymmetry of transmission characteristics in the pass bandwidth is:

a) Considering a filed distribution at a light collecting point in the second (output side) slab waveguide, it is difficult to eliminate completely the difference in the optical path length between the optical path length to transmit light with the longest optical path length and the optical path length to transmit light with the shortest optical path length. As a result, it can be estimated to decrease the deterioration of symmetry of boundly distribution, and b) The influence of a mismatched connection caused by the distance from the center of each core (elements of the output waveguide) connected to the second slab waveguide.

In other words, according to the present invention explained above, it can be considered that the transmission characteristics can be matched to the field distribution form at the light collecting point in the second (output side) slab waveguide, by connecting the cores 14-$n$ to 14$n$ (except 14$o$) connected to the output ports 16-$n$ to 16$n$ except the output port 16$o$ placed on the center line, to the predetermined positions of the second slab waveguide 16, so that the angle formed with the normal line of the Rowland circle is increased as the center line is separated from the core 14$o$ placed at the center.

In the above-mentioned array waveguide optical multiplexer/demultiplexer 10 described with reference to FIG. 1, a multiple optical signal from an SMF (single mode fiber) (not mentioned) is input into the input waveguide 12. On the other hand, from the output waveguide 14, a divided optical signal is output to the single mode fibers (SMF) connected to the output side of the array waveguide optical multiplexer/demultiplexer 10, though not explained in detail. The optical signal input into the output waveguide 14 is of course the output with a predetermined wavelength interval divided from the multiple signal input from the first slab waveguide 15, array waveguide 13 and second slab waveguide 16 through the input waveguide 12. In this case, because of the reason explained in FIG. 2, the connection loss (coupling loss) between the cores of the output waveguide 14 and the second slab waveguide 16.

Further, the decrease of known PDL (increase of the worst value of PDL) caused by the difference in transmission characteristics between the core placed at the center and the cores placed at both ends of the output waveguide 14 connected to the second slab waveguide 16 is minimized. The increase of ripple in the flat top output waveguide with the flat transmission characteristics is reduced.

Figure 3:
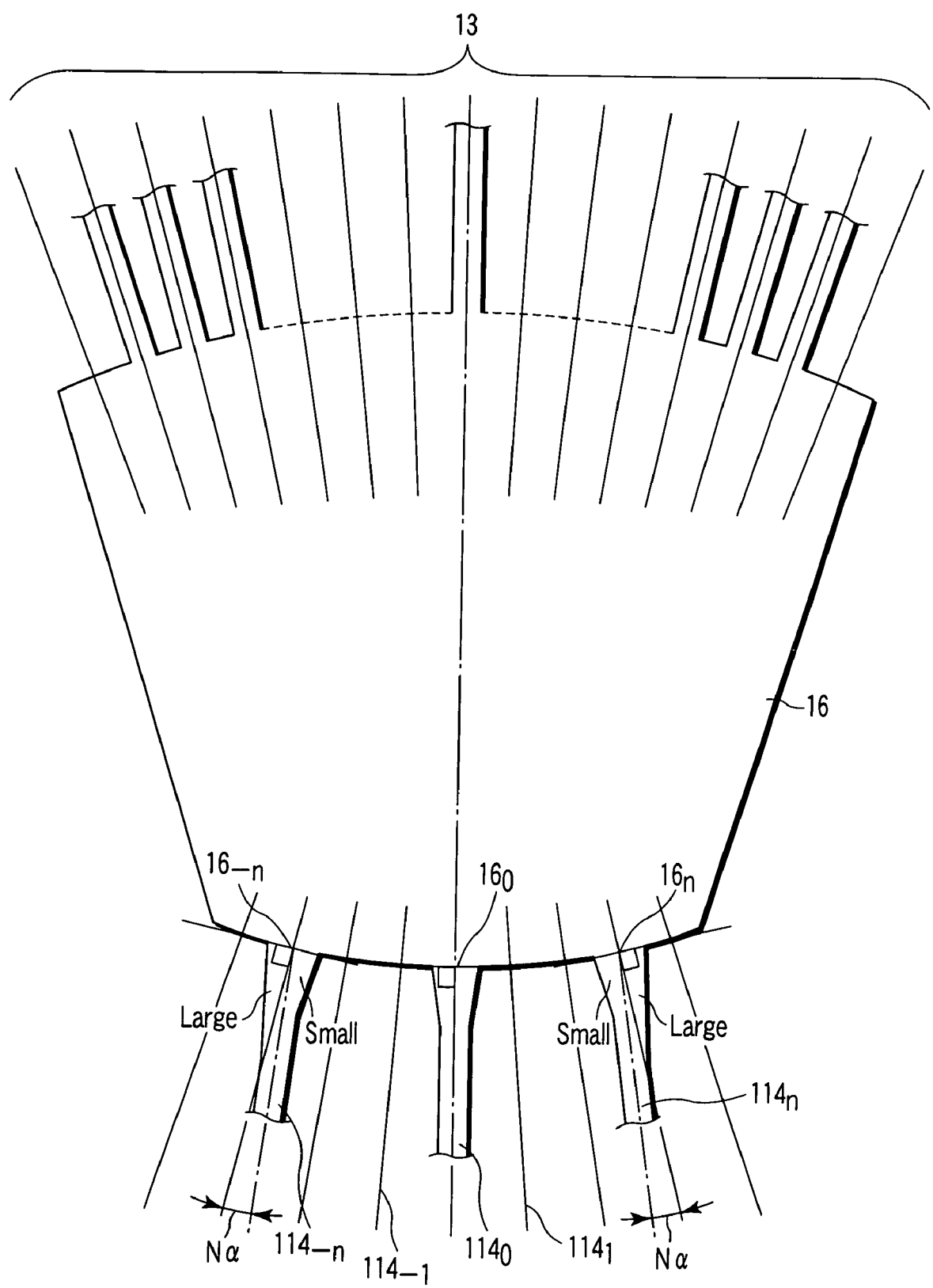
FIG. 3 is a schematic illustration for explaining an example of the configuration of the essential part of the array waveguide shown in FIG. 1.

FIG. 3 explains another embodiment to connect the output side slab waveguide and output waveguide explained before with reference to FIG. 2. The same reference numerals are given to the same components as those explained with reference to FIG. 1 and FIG. 2, and detailed explanation will be omitted.

In the array waveguide refraction grating optical multiplexer/demultiplexer shown in FIG. 3, a desired number of cores except the central core 114$o$ in the output waveguide 114 is connected to the output ports 16-$n$ and 16$n$ of the second slab waveguide 16 at desired positions on the circumference of the Rowland circle defining the output terminal of the second slab waveguide 16, in the state that the center axis is inclined by a predetermined angle $\alpha \times n$ (-n) against the normal line of the Rowland circle. (This is the same as the example shown in FIG. 2.) In the connecting part of each core 114-$n$ to 114$n$ connected to the slab waveguide 16, a taper is formed with the sectional diameter of the slab waveguide side defined largely. The taper is formed asymmetrical to the normal line of the circumference of the Rowland circle except the central core 114$o$. The taper provided in each core except the central core 114$o$ is defined to increase the part opposite to the central core 114$o$ relative to the normal line of the Rowland circle, as the distance from the central core 114$o$ is increased.

Namely, the cores 114-$n$ and 114$n$ connected to both end portions of the second slab waveguide 16 are given a taper defined to maximize the part opposite to the central core, taking the normal line of the center line as a reference. The taper given to the cores 114-1 (shown simply) and core 1141 (shown simply) placed on both sides of the central core 114$o$ is formed large in the part opposite to the central core, but the dimension (the size of the asymmetrical part) is minimum compared with the dimension of the asymmetrical part of the taper of the other core.

Figure 4:
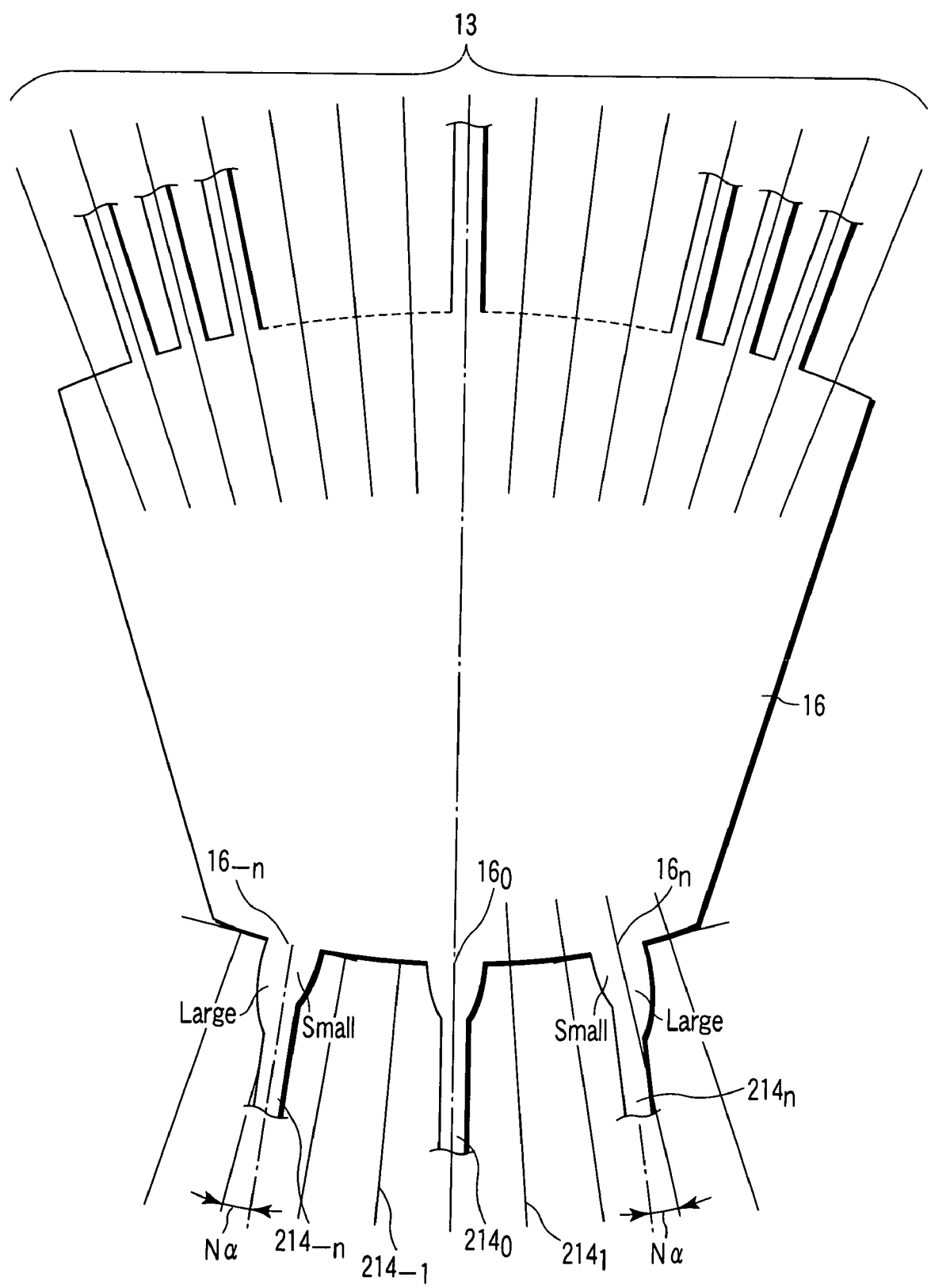
FIG. 4 is a schematic illustration for explaining an example of the configuration of the essential part of the array waveguide shown in FIG. 1.

FIG. 4 explains another embodiment to connect the output side slab waveguide and output waveguide explained before with reference to FIG. 2. The same reference numerals are given to the same components as those explained with reference to FIG. 1 and FIG. 3, and detailed explanation will be omitted.

In the array waveguide refraction grating optical multiplexer/demultiplexer shown in FIG. 4, a desired number of cores except the central core 214$o$ in the output waveguide 214 is connected to the output ports 16-$n$ and 16$n$ of the second slab waveguide 16 at desired positions on the circumference of the Rowland circle defining the output terminal of the second slab waveguide 16, in the state that the center axis is inclined by a predetermined angle $\alpha \times n$ (-n) against the normal line of the Rowland circle. (This is the same as the example shown in FIG. 2.)

The connecting part of each core 214-$n$ to 214$n$ connected to the slab waveguide 16 is formed parabolic with the sectional diameter of the slab waveguide side defined largely. The parabolic part is formed asymmetrical to the normal line of the circumference of the Rowland circle except the central core 214$o$. The parabolic part provided in each core except the central core 214$o$ is defined to increase the part opposite to the central core 214$o$ relative to the normal line of the Rowland circle, as the distance from the central core 214$o$ is increased.

Namely, the parabolic connecting part explained with reference to FIG. 4 can be replaced by the taper shown in FIG. 3.

Figure 7:
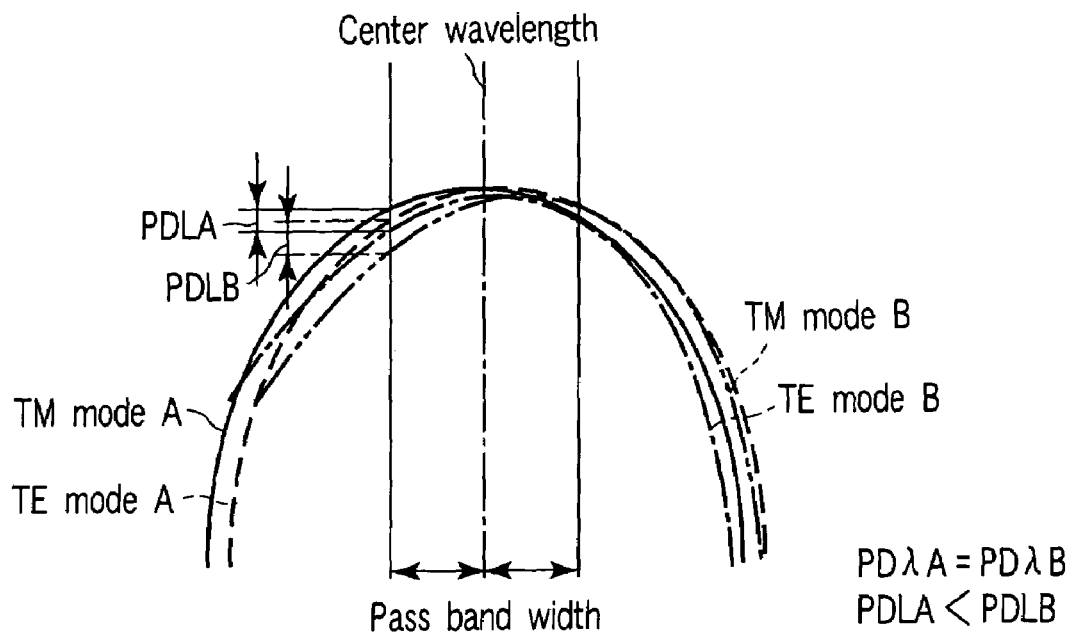
FIG. 7 is a graph showing one wavelength (one channel) extracted from the transmission characteristics of the present invention using the connection of the slab waveguide and output waveguide explained in FIG. 2 to FIG. 4.
Figure 8:
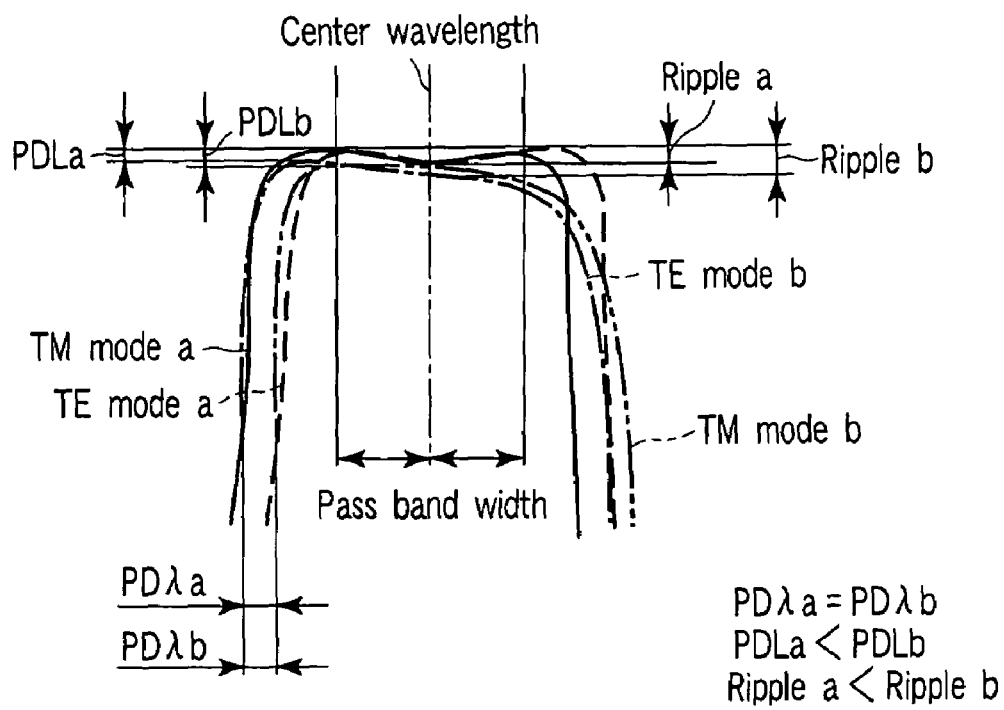
FIG. 8 is a graph showing one wavelength (one channel) extracted from the transmission characteristics of the present invention using the connection of the slab waveguide and output waveguide explained in FIG. 2 to FIG. 4.

The increase of the transmission characteristic in the pass bandwidth can be prevented by connecting the cores connected to the output ports at the output end of the slab waveguide connected (output) to the output side of the array waveguide by changing the angle formed with the normal line of the Rowland circle according to the distance from the center of the slab waveguide, and also by providing an asymmetrical taper or parabolic connecting part increased in the part opposite to the core placed at the center with respect to the normal line, as explained above. Namely, the local deterioration of PDL (increase of the worst value of PDL) explained later with reference to FIG. 7 is decreased. The largeness of ripple in the pass bandwidth generated in the array waveguide with the generally flat transmission characteristics as explained later with reference to FIG. 8 is decreased.

Figure 5:
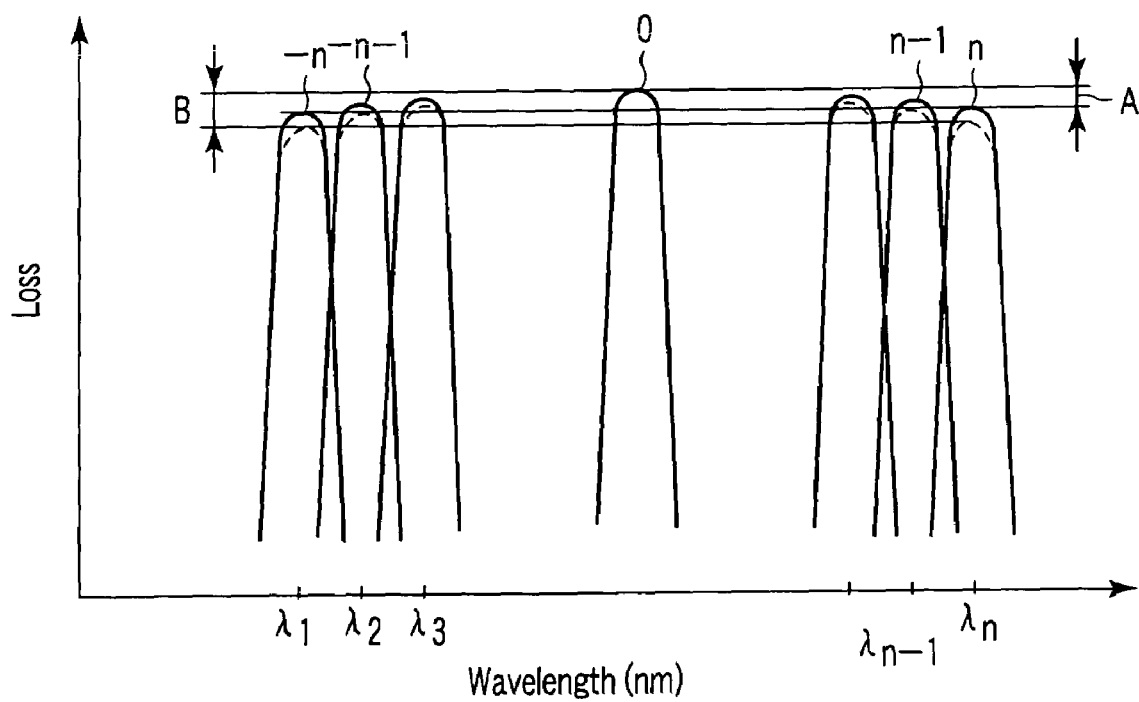
FIG. 5 is a graph showing the transmission characteristics of the present invention using the connection of the slab waveguide and output waveguide explained in FIG. 2 to FIG. 4.

FIG. 5 shows the transmission characteristics of the present invention using the connection of the slab waveguide and output waveguide explained with reference to FIG. 2 to FIG. 4. FIG. 5 shows an example with Gaussian distribution of the transmission characteristics.

In FIG. 5, the degree of loss in optical signals with the wavelengths $\lambda 1$ to $\lambda n$ used for channels $-n$ to n is improved in the channels $-n$ and n placed at both ends compared with the central channel O, and the difference between the center and both ends is decreased compared with the example using the known connection indicated by the dotted line. Namely, when the present invention is indicated by A and the comparison example is indicated by B, the evenness as a difference between the center and both ends becomes A< B, and the evenness is improved by the present invention.

Figure 6:
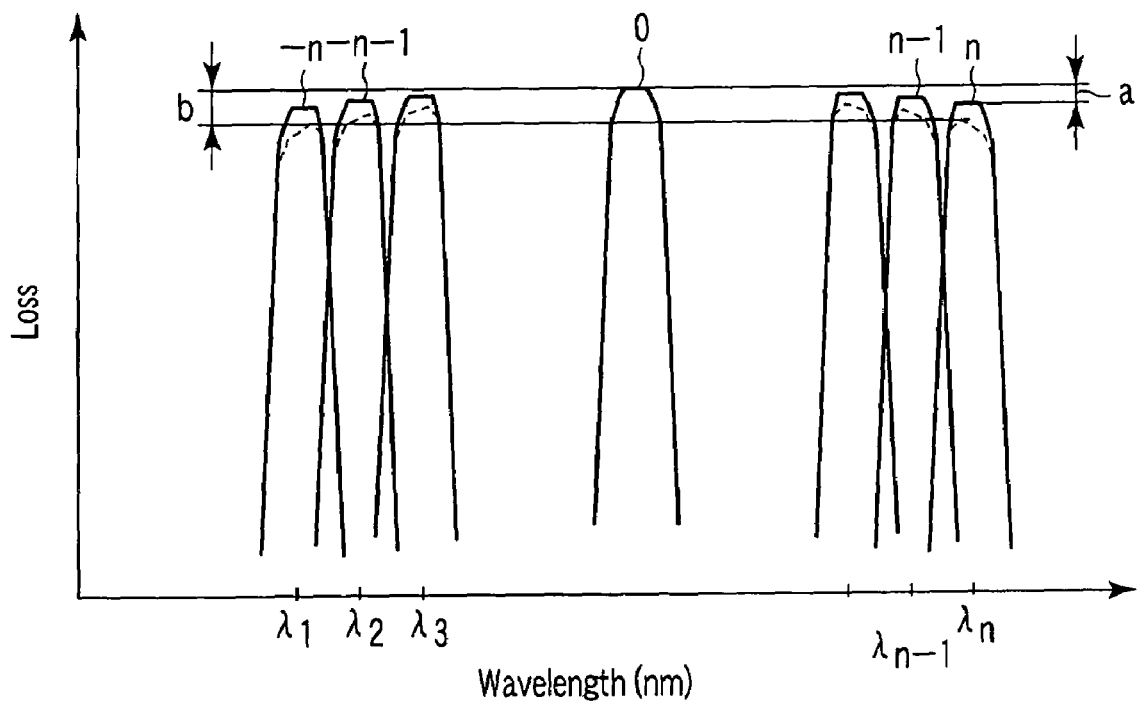
FIG. 6 is a graph showing the transmission characteristics of a flat top array waveguide with flat transmission characteristics, using the connection of the slab waveguide and output waveguide explained in FIG. 2 to FIG. 4.

FIG. 6 shows the transmission characteristics obtained when the connection of the slab waveguide and output waveguide explained with reference to FIG. 2 to FIG. 4 is applied to the flat top array waveguide with flat transmission characteristics.

In FIG. 6, the degree of loss in optical signals with the wavelengths $\lambda 1$ to $\lambda n$ used for channels $-n$ to n is improved in the channels $-n$ and n placed at both ends compared with the central channel O, and the difference between the center and both ends is decreased compared with the example using the known connection indicated by the dotted line. Namely, when the present invention is indicated by $\underline{a}$ and the comparison example is indicated by $\underline{b}$, the evenness as a difference between the center and both ends becomes a<$\underline{b}$, and the evenness is improved by the present invention.

FIG. 7 shows the transmission characteristics of the present invention using the connection of the slab waveguide and output waveguide explained with reference to FIG. 2 to FIG. 4, with an optional one wavelength (one channel) extracted. FIG. 7 corresponds to FIG. 5, and shows an example with Gaussian distribution of transmission characteristics. As in FIG. 5, a label A is added for the present invention, and B is added for the comparison example.

As seen from FIG. 7, displacement of the center wavelength is generally equal, and PDLA<PDLB even if PD$\lambda$A=PD$\lambda$B. PDLA<PDLB indicates that a width of the pass band is broadened when the width of the pass band is controlled (defined) by the worst value of PDL. Further, this result does not depend on modes, and is equal in TM mode and TE mode.

More particularly, it is confirmed by |A−B| that the maximum insertion loss is improved by 0.7 dB and the crosstalk level is improved by 5 dB in a 40-channel Gaussian array waveguide diffraction grating optical multiplexer/demultiplexer. Further, it is confirmed that the asymmetry is improved in each channel.

FIG. 8 shows the transmission characteristics obtained when the connection of the slab waveguide and output waveguide explained with reference to FIG. 2 to FIG. 4 is applied to a flat top array waveguide diffraction grating optical multiplexer/demultiplexer with flat transmission characteristics, with an optional one wavelength (one channel) extracted. FIG. 8 corresponds to FIG. 6, and shows an example with flat top transmission characteristics. As in FIG. 6, a label a is added for the present invention, and b is added for the comparison example.

As seen from FIG. 8, displacement of the center wavelength is generally equal, and PDLa<PDLb even if PD$\lambda$a=PD$\lambda$b. PDLA<PDLB is the same as in FIG. 7, and used to control a width of the pass band. Further, this result does not depend on modes, and is equal in TM mode and in TE mode.

Concerning ripple peculiar to a flat top array waveguide diffraction grating optical multiplexer/demultiplexer, ripple a<ripple b and it is confirmed that the largeness of ripple is controlled.

More particularly, it is confirmed by |a−b| that a maximum insertion loss is generally improved by 0.7 dB and the crosstalk level is improved by 5 dB in a 40-channel Gaussian array waveguide diffraction grating optical multiplexer/demultiplexer. Further, it is confirmed that the asymmetry is improved in each channel.

As described above, when connecting the output side slab waveguide and a desired number of output waveguide channels in the array waveguide diffraction grating optical multiplexer/demultiplexer, the increase of asymmetry of transmission characteristics in a pass bandwidth can be controlled by connecting the output waveguide provided for each channel by changing the angle formed with the normal line of the Rowland circle according to the distance from the center of the slab waveguide.

When the end portion of the output waveguide is shaped tapering or parabolic in the part connected to the slab waveguide, the largeness of the taper or parabolic portion may be asymmetrical, and the dimension of the portion outside the center may be larger.

As explained above, according to the present invention, the connection loss caused by a mismatched mode between the second waveguide and output waveguide in the array waveguide diffraction grating (AWG) optical multiplexer/demultiplexer is decreased, and the asymmetry for the center of transmission characteristics in the pass bandwidth is controlled.

Therefore, the signal waveform is uniform, and the bandwidth is improved to be capable of ensuring a predetermined level PDL.

The present invention is not limited to the embodiments described hereinbefore. The invention may be embodied in other specific forms or modified without departing from its spirit or essential characteristics. Each embodiment may be appropriately combined as far as possible. In this case, the effect by combination will be obtained.

According to the present invention, the increase of asymmetry of transmission characteristics in a pass bandwidth is controlled, and an array waveguide diffraction grating optical multiplexer/demultiplexer with a small connection loss between the output waveguide and slab waveguide can be obtained.

According to the present invention, an array waveguide diffraction grating optical multiplexer/demultiplexer with low crosstalk can be obtained.

Moreover, the signal waveform is uniform, and the bandwidth is improved to be capable of ensuring a predetermined level PDL.

What is claimed is:

1. A multichannel array waveguide diffraction grating multiplexer/demultiplexer comprising:

an array waveguide which has cores layered on a base board and clad to cover the cores, each of the array waveguide given a predetermined curvature;

an input side slab waveguide which is layered on a base board, and inputs an optical signal input through an input waveguide to the array waveguide; and an output side slab waveguide which outputs the optical signal output from the array waveguide to an output waveguide, wherein the output waveguide is given a predetermined form changed to meet the form of field distribution at a light collecting point of the output side slab waveguide, and connected to the output side slab waveguide, and a plurality of output waveguides is arranged on the arc peculiar to the output side slab waveguide, and when the output side slab waveguide is connected to the output side slab waveguide through a connecting part formed tapering or parabolic, an asymmetrical portion of the tapering or parabolic connecting part is increased as the distance from the output waveguide placed at the center on the arc with respect to the output waveguide placed at the center of the arc of the output waveguide.

2. A multichannel array waveguide diffraction grating multiplexer/demultiplexer comprising:

an array waveguide which has cores layered on a base board and clad to cover the cores, each of the array waveguide given a predetermined curvature;

an input side slab waveguide which is layered on a base board, and inputs an optical signal input through an input waveguide to the array waveguide; and an output side slab waveguide which outputs the optical signal output from the array waveguide to an output waveguide, wherein the output waveguide is given a predetermined form changed to meet the form of field distribution at a light collecting point of the output side slab waveguide, and connected to the output side slab waveguide and a plurality of the output waveguide is arranged on an arc peculiar to the output side slab waveguide, and when connected with the output side slab waveguide, an angle formed between the center of the output waveguide and the normal line of the arc is increased in a predetermined direction, as the distance from the output waveguide placed at the center of the arc is increased with respect to the output waveguide placed at the center of the arc of the output waveguide.

3. The multichannel array waveguide diffraction grating multiplexer/demultiplexer according to claim 2, wherein the angle formed between the center of the output waveguide and the normal line of the arc is increased in the direction of the output waveguide side placed at the center.

4. The multichannel array waveguide diffraction grating multiplexer/demultiplexer according to claim 2, wherein the angle formed between the center of the output waveguide and the normal line of the arc is an angle formed between the output waveguide side placed at the center, the output waveguides placed on both sides and the normal line of the arc, which is increased proportional to the distance from the center to a desired output waveguide.

5. The multichannel array waveguide diffraction grating multiplexer/demultiplexer according to claim 3, wherein the angle formed between the center of the output waveguide and the normal line of the arc is an angle formed between the output waveguide side placed at the center, the output waveguides placed on both sides and the normal line of the arc, which is increased proportional to the distance from the center to a desired output waveguide.

6. The multichannel array waveguide diffraction grating multiplexer/demultiplexer according to claim 1, wherein the largeness of the asymmetrical portion of the tapering or parabolic connecting part is increased in the direction reverse to the output waveguide placed at the center.

7. A multichannel array waveguide diffraction grating multiplexer/demultiplexer comprising:

an array waveguide provided at a predetermined position on a base board;

a slab waveguide provided on the output side of the array waveguide; and an output waveguide which is connected to the slab waveguide, has a connecting surface forming a Rowland circle, and includes a core having angle formed with the normal line of the Rowland circle is defined by $\alpha, 2\alpha, 3\alpha, \ldots, (N-1)\alpha, N\alpha$ from the center core to the cores at both ends according to the position of the center core, when an angle formed between the center line of the core placed on both sides of the core placed at the center and the normal line of the Rowland circle is assumed to be $\alpha$.

8. The multichannel array waveguide diffraction rating multiplexer/demultiplexer according to claim 7, wherein the angle formed between the center of the cores other than the core placed at the center of the output waveguide and the normal line of the Rowland circle is increased toward the core placed at the center.

9. The multichannel array waveguide diffraction rating multiplexer/demultiplexer according to claim 8, each core of the output waveguide has a connecting part formed tapering or parabolic in the side connected to the slab waveguide, each connecting part includes an asymmetrical area increased to the side reverse to the center of the core placed at the center, as the distance from the core placed at the center is increased.

10. A method of connecting an output waveguide which is connected to a slab waveguide provided in the output side of an array waveguide provided at a predetermined position on a base place, to the slab waveguide, wherein a desired number of cores is connected to each output port of the slab waveguide at an angle defined by $\alpha, 2\alpha, 3\alpha, \ldots, (N-1)\neq, N\alpha$, from the center core to the cores at both ends, according to the position of the center core on the circumference of the Rowland circle, when an angle formed with the normal line of the Rowland circle is an angle formed between the center line of the core placed on both sides of the core placed at the center and the normal line of the Rowland circle, and assumed to be $\alpha$.

11. The method of connecting an output waveguide which is connected to a slab waveguide provided in the output side of an array waveguide provided at a predetermined position on a base place, to the slab waveguide, according to claim 10, wherein each core has a connecting area formed tapering or parabolic on the side connected to the slab waveguide, and each connecting area includes an asymmetrical area increased to the side reverse to the center of the core placed at the center, as the distance from the core placed at the center is increases.

* * * * *